(12) United States Patent
He et al.

(10) Patent No.: US 11,839,912 B2
(45) Date of Patent: Dec. 12, 2023

(54) AUTOMOBILE WHEEL HUB SHAPING DEVICE

(71) Applicant: CITIC Dicastal CO., LTD., Hebei (CN)

(72) Inventors: Yudong He, Qinhuangdao (CN); Libo Liu, Qinhuangdao (CN)

(73) Assignee: CITIC DICASTAL CO., LTD., Hebei (CN)

( * ) Notice: Subject to any disclaimer, the term of this patent is extended or adjusted under 35 U.S.C. 154(b) by 707 days.

(21) Appl. No.: 16/568,901

(22) Filed: Sep. 12, 2019

(65) Prior Publication Data

US 2020/0338627 A1    Oct. 29, 2020

(30) Foreign Application Priority Data

Apr. 26, 2019 (CN) .......................... 201910345697.9

(51) Int. Cl.
*B21H 1/10* (2006.01)
*B60B 30/08* (2006.01)
*B21K 1/40* (2006.01)

(52) U.S. Cl.
CPC ................. *B21K 1/40* (2013.01); *B21H 1/10* (2013.01); *B60B 30/08* (2013.01); *B60B 2310/224* (2013.01); *B60B 2320/00* (2013.01)

(58) Field of Classification Search
CPC .... Y10T 29/49536; B21K 1/40; B21D 53/16; B21H 1/02; B21H 1/10; B21H 1/12; B60B 30/08; B60B 2310/224
USPC ......... 29/894.36, 894.362; 72/104, 108, 109, 72/111, 449
See application file for complete search history.

(56) References Cited

U.S. PATENT DOCUMENTS

| 567,328 | A | * | 9/1896 | Warman | ................. | B21D 17/04 |
| | | | | | | 29/894.362 |
| 715,777 | A | * | 12/1902 | Fowler | ..................... | B21H 1/02 |
| | | | | | | 72/107 |
| 1,263,175 | A | * | 4/1918 | Wells | ...................... | F16B 39/04 |
| | | | | | | 411/316 |
| 10,828,948 | B2 | * | 11/2020 | Gonzaga | .............. | B60C 25/132 |
| 2004/0035164 | A1 | | 2/2004 | Blaser | | |

FOREIGN PATENT DOCUMENTS

| CN | 2298076 | Y | | 11/1998 | | |
| CN | 106217052 | A | * | 12/2016 | ............. | B23P 23/04 |
| CN | 106425488 | A | * | 2/2017 | ............. | B23P 23/04 |
| CN | 106827595 | A | | 6/2017 | | |
| CN | 107322387 | A | | 11/2017 | | |

(Continued)

*Primary Examiner* — Katrina M Stransky
*Assistant Examiner* — Jared O Brown
(74) *Attorney, Agent, or Firm* — Cooper Legal Group, LLC

(57) ABSTRACT

The present disclosure discloses an automobile wheel hub shaping device. The automobile wheel hub shaping device includes a clamping part for clamping a wheel hub to be shaped, a first driving mechanism for driving the clamping part to rotate, a shaping roller for shaping the wheel hub to be shaped, and a rack; all the clamping part, the first driving mechanism and the shaping roller are mounted to the rack, the shaping roller is located above the clamping part and is capable of rotating relative to the clamping part; and the clamping part is equipped with a fixing part for fixing the wheel hub to be shaped.

8 Claims, 3 Drawing Sheets

(56) References Cited

FOREIGN PATENT DOCUMENTS

| | | | | |
|---|---|---|---|---|
| CN | 107932219 | A * | 4/2018 | ............. B24B 41/02 |
| CN | 207271857 | U | 4/2018 | |
| CN | 109175554 | A * | 1/2019 | ............... B23H 7/02 |
| CN | 208341415 | U | 1/2019 | |
| CN | 209773133 | U | 12/2019 | |
| JP | 2015221443 | A * | 12/2015 | |
| KR | 101560178 | B1 | 10/2015 | |
| RU | 86508 | U1 | 9/2009 | |

* cited by examiner

AUTOMOBILE WHEEL HUB SHAPING DEVICE

The present application claims priority to Chinese Patent Application No. 201910345697.9, filed on Apr. 26, 2019, the contents of which are hereby incorporated by reference in their entirety.

BACKGROUND

The circumferential surface of a wheel hub is easy to deform and twist when meeting an uneven road in a high-speed running process of a vehicle to further result in out-of-roundness; compared with surface damage such as bump and scratch, deformation and twist are relatively difficult to restore; there is generally no professional wheel hub repairing equipment in an existing automobile repairing plant, random hitting can be only performed, and therefore, the repairing quality is difficult to guarantee; and the main reason that there is no professional equipment in the repairing plant lies in that the wheel hub repairing equipment is relatively expensive in most cases.

SUMMARY

The present disclosure relates to an automobile repairing technology and in particular to an automobile wheel hub shaping device.

In view of above, the embodiment of the present disclosure expects to provide an automobile wheel hub shaping device capable of conveniently restoring the deformation of an automobile wheel hub and has a low cost.

In order to achieve the aim above, the technical solution of the embodiment of the prevent disclosure is realized in such a way:

the embodiment of the present disclosure provides an automobile wheel hub shaping device. The device includes a clamping part for clamping a wheel hub to be shaped, a first driving mechanism for driving the clamping part to rotate, a shaping roller for shaping the wheel hub to be shaped, and a rack; all of the clamping part, the first driving mechanism and the shaping roller are mounted to the rack, the shaping roller is located above the clamping part, and the shaping roller is capable of rotating relative to the clamping part; and the clamping part is equipped with a fixing part for fixing the wheel hub to be shaped.

In the solution, the clamping part may include a locating shaft matched with an axle hole of the wheel hub to be shaped and a supporting disc matched with an inner cavity of the wheel hub to be shaped, the locating shaft and the supporting disc are fixed together, and the axes of the locating shaft and the supporting disc are superposed; the clamping part is capable of rotating relative to the rack by taking the axis of the supporting disc as an axis.

In the solution, the clamping part may further include a locking ring for locking the wheel hub to be shaped, an inner wall of the locking ring is provided with internal threads, and the locating shaft is provided with external threads matched with the internal threads.

In the solution, the clamping part may further include anti-loosening buckles, the anti-loosening buckles include fixing inserted pins, and the fixing inserted pins pass through the locking ring from outer side of an outer circle surface of the locking ring and are inserted into the locating shaft; and the outer circle surface of the locating shaft is provided with inserted pin holes matched with the fixing inserted pins.

In the solution, the device may further include a rotating shaft capable of rotating relative to the rack, one end of the rotating shaft is rotatably mounted to the rack, the other end of the rotating shaft is fixed to the supporting disc, and an axis of the rotating shaft is superposed with the axis of the supporting disc; and the rack includes a rotating shaft hole or a rotating support matched with the rotating shaft.

In the solution, the first driving mechanism may include a first motor and a driving gear; the first motor is fixed to the rack; the driving gear is connected with an output shaft of the first motor, and the driving gear rotates under the driving of the first motor; and the supporting disc further includes teeth engaged with teeth of the driving gear, and the teeth of the supporting disc are arranged on the outer circle surface of one side of the supporting disc.

In the solution, the rack may include a base and a vertical plate; the bottom of the vertical plate is fixed to the base; the rotating shaft is rotatably mounted to the vertical plate, and the axis of the rotating shaft is oriented in a horizontal direction; the first motor is fixed to the vertical plate, and an axis of the output shaft of the first motor is oriented in the horizontal direction; both the supporting disc and the driving gear are located at one side of the vertical plate, and the first motor is located at the other side of the vertical plate; the output shaft of the first motor penetrates through the vertical plate and then is connected to the driving gear.

In the solution, the device further may include a shaping roller mounting plate, one end of the shaping roller mounting plate is mounted to the vertical plate in a way of being capable of moving up and down, the vertical plate includes a sliding chute for allowing the shaping roller mounting plate to move up and down therein, and the other end of the shaping roller mounting plate is provided with the shaping roller.

In the solution, the device may further include a second driving mechanism for driving the shaping roller to rotate, the second driving mechanism includes a second motor, the second motor is fixed to the shaping roller mounting plate, and an output shaft of the second motor is connected with the shaping roller.

In the solution, the device may further include a third driving mechanism for driving the shaping roller mounting plate to move up and down, the third driving mechanism includes a screw nut and a screw rod, the screw nut is arranged at the end, located on the sliding chute, of the shaping roller mounting plate, the screw rod includes a force application end and a driving end, the force application end is located above the vertical plate, and the driving end penetrates into the sliding chute from a top side of the vertical plate and is screwed into the screw nut.

In the solution, the automobile wheel hub shaping device disclosed by the embodiment of the present disclosure may include the clamping part for clamping the wheel hub to be shaped, the first driving mechanism for driving the clamping part to rotate, the shaping roller for shaping the wheel hub to be shaped, and the rack; all of the clamping part, the first driving mechanism and the shaping roller are mounted to the rack, the shaping roller is located above the clamping part and is capable of rotating relative to the clamping part; and the clamping part is equipped with the fixing part for fixing the wheel hub to be shaped. Therefore, the automobile wheel hub shaping device disclosed by the embodiment of the present disclosure is capable of conveniently restoring the deformation of an automobile wheel hub due to shaping by rotating the wheel hub to be shaped during rotation and low in cost.

Other beneficial effects of the embodiment of the present disclosure will be further described in the detailed description in combination with a specific technical solution.

BRIEF DESCRIPTION OF THE DRAWINGS

In order to more clearly describe the technical solution in the embodiment of the present disclosure, accompanying drawings required to be used in the description of the embodiment will be briefly described below. It should be understood that the accompanying drawings described below are only a part of accompanying drawings in the embodiment of the present disclosure, and other accompanying drawings may also be obtained by the ordinary skilled in the art according to the accompanying drawings on the premise that no creative work is provided.

DETAILED DESCRIPTION OF THE EMBODIMENTS

Figure 1:
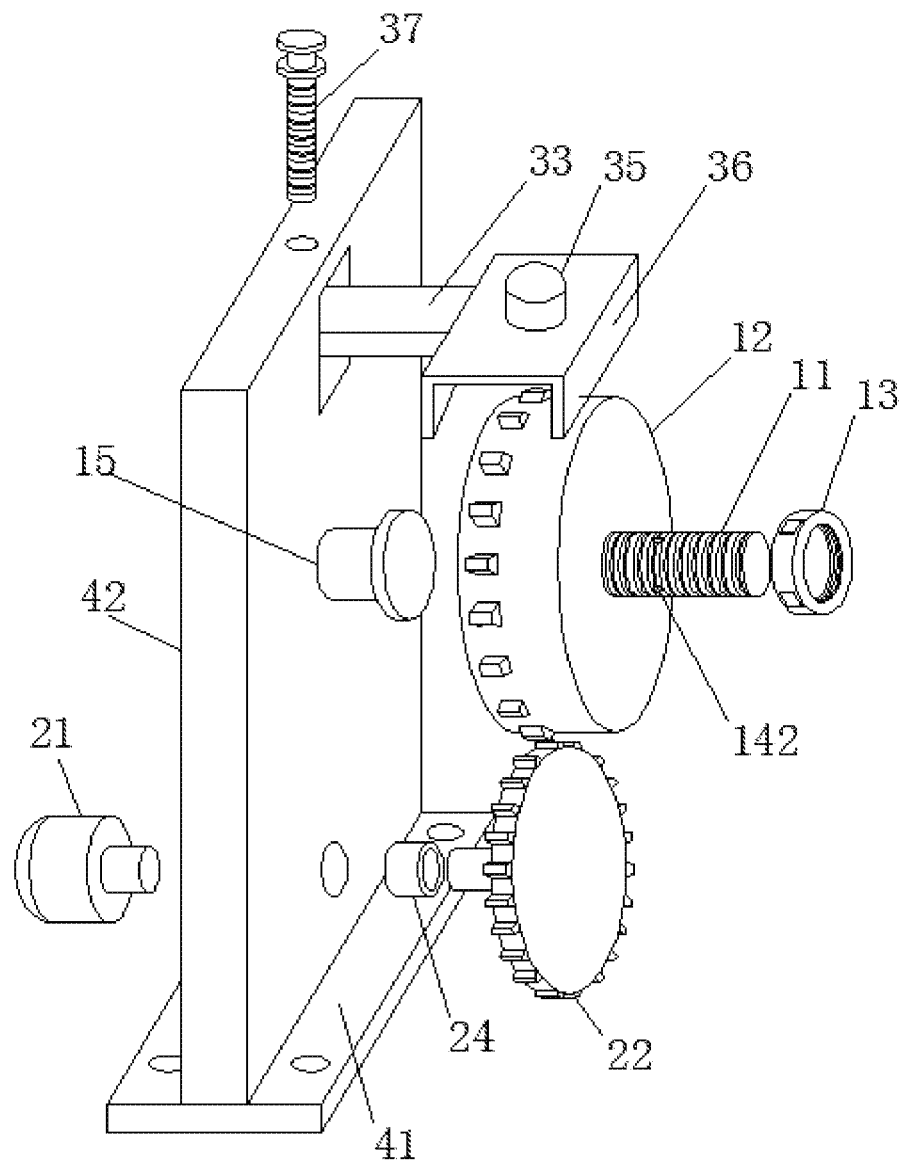
FIG. 1 is a structural schematic diagram (exploded view) of an automobile wheel hub shaping device according to an embodiment of the present disclosure.
Figure 2:
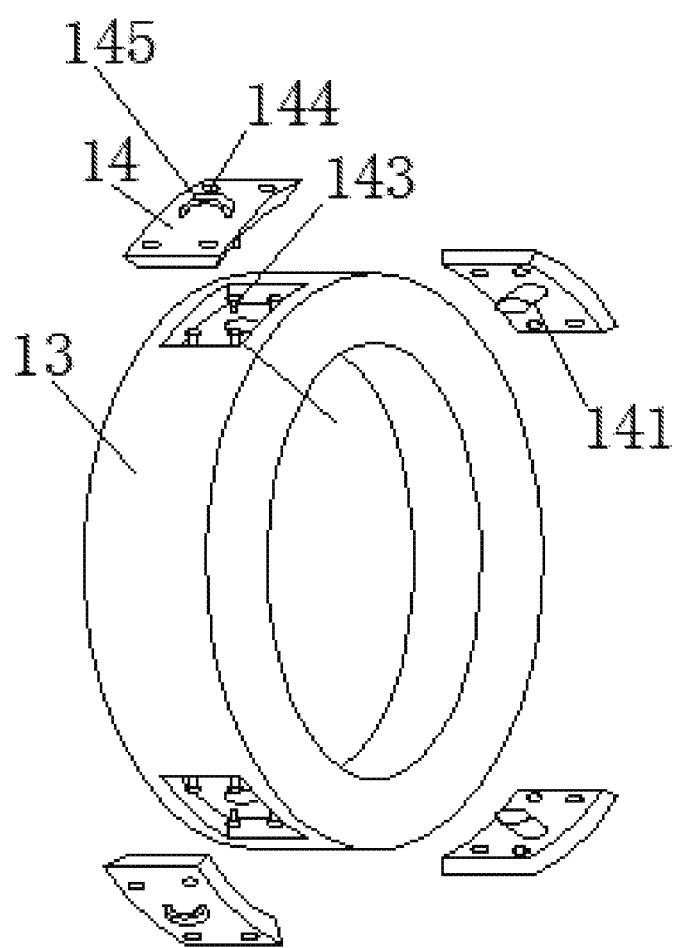
FIG. 2 is a schematic diagram of a locking ring in the automobile wheel hub shaping device according to the embodiment of the present disclosure.
Figure 3:
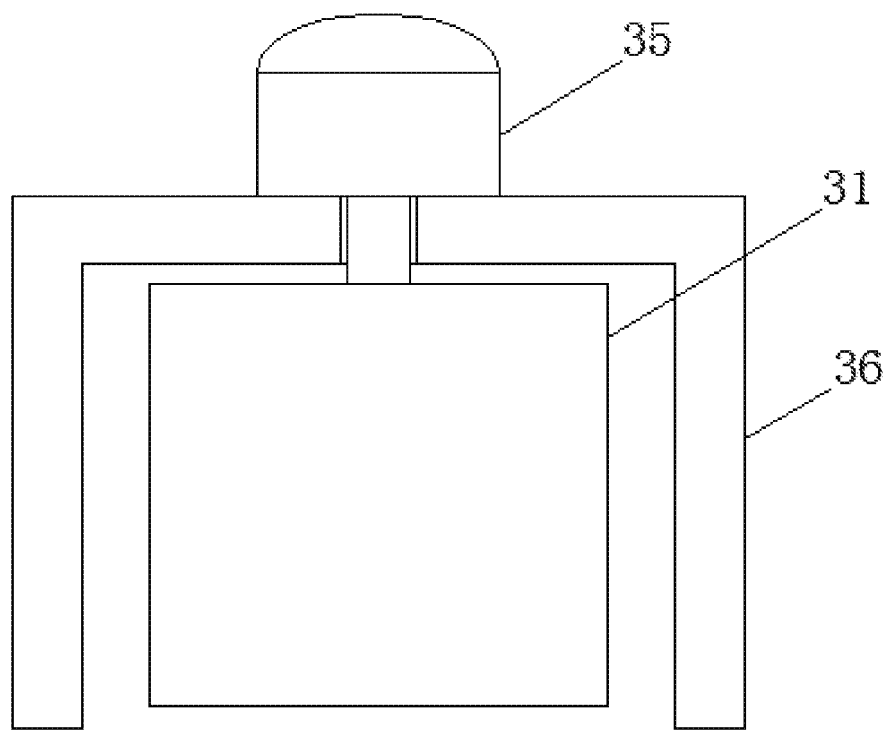
FIG. 3 is a schematic diagram of a shaping roller and a second driving mechanism in the automobile wheel hub shaping device according to the embodiment of the present disclosure.

It should be noted that the term "connection" in contents of the embodiment of the present disclosure should be generally understood unless otherwise specified and limited, for example, the connection may be electric connection, communication inside of two elements, direct connection, or indirect connection by virtue of an intermedium; the specific meaning of the above term may be understood by the ordinary skilled in the art according to specific conditions. Terms "first/second/third" in the contents of the embodiment of the present disclosure are only intended to distinguish similar objects, rather than to represent for a specific order of the targeted objects, and it is understood that the specific order or the sequence of "first/second/third" may be interchanged under an allowable condition.

The embodiment of the present disclosure provides an automobile wheel hub shaping device. The device includes a clamping part for clamping a to-be-shaped wheel hub, a first driving mechanism for driving the clamping part to rotate, a shaping roller for shaping the to-be-shaped wheel hub, and a rack; all of the clamping part, the first driving mechanism and the shaping roller are mounted to the rack, the shaping roller is located above the clamping part, and the shaping roller is capable of rotating relative to the clamping part; and the clamping part is equipped with a fixing part for fixing the to-be-shaped wheel hub.

Herein, the repairing principle is similar to that of an ordinary machine tool, the to-be-shaped wheel hub is similar to a to-be-machined workpiece, while the shaping roller is similar to a turning tool, thus, the repairing effect is good, and the efficiency is high.

The automobile wheel hub shaping device in the embodiment of the present disclosure is capable of conveniently restoring the deformation of an automobile wheel hub by rotating the to-be-shaped wheel hub, and shaping the wheel hub during rotation, which has a low cost.

In an implementation, the clamping part includes a locating shaft matched with an axle hole of the to-be-shaped wheel hub and a supporting disc matched with an inner cavity of the to-be-shaped wheel hub, the locating shaft and the supporting disc are fixed together, and the axes of the locating shaft and the supporting disc are superposed; and the clamping part is capable of rotating relative to the rack by taking the axis of the supporting disc as an axis. As the inner cavity of the to-be-shaped wheel hub is empty, the cavity needs to be supported by the supporting disc during shaping, so as to avoid the outer circle surface of the wheel hub is made to concave inwardly during shaping. Of course, the inner cavity of the to-be-shaped wheel hub may also be supported by other supporting structures besides the supporting disc.

In an implementation, the clamping part further includes a locking ring for locking the to-be-shaped wheel hub, an inner wall of the locking ring is provided with internal threads, and the locating shaft is provided with external threads matched with the internal threads. Locking is performed in a threaded way which is more convenient and reliable and is a preferred way.

In an implementation, the clamping part further includes anti-loosening buckles, the anti-loosening buckles include fixing inserted pins, and the fixing inserted pins pass through the locking ring from outer side of an outer circle surface of the locking ring and are inserted into the locating shaft; and the outer circle surface of the locating shaft is provided with inserted pin holes matched with the fixing inserted pins. Thus, the phenomenon that the locking ring is loosened during vibration to result in position offset of the to-be-shaped wheel hub to affect the shaping effect may be avoided, and the implementation is a preferred way.

In an implementation, the device further includes a rotating shaft capable of rotating relative to the rack, one end of the rotating shaft is rotatably mounted to the rack, the other end of the rotating shaft is fixed to the supporting disc, and an axis of the rotating shaft is superposed with the axis of the supporting disc; and the rack includes a rotating shaft hole or a rotating support matched with the rotating shaft. Thus, the to-be-shaped wheel hub rotates more smoothly, and the implementation is a preferred way.

In an implementation, the first driving mechanism includes a first motor and a driving gear; the first motor is fixed to the rack; the driving gear is connected with an output shaft of the first motor, and the driving gear rotates under the drive of the first motor; and the supporting disc further includes teeth engaged with teeth of the driving gear, and the teeth of the supporting disc are arranged on the outer circle surface of one side of the supporting disc. Thus, the driving is more effective, a larger torque may be transferred to the supporting disc and the shaping is also made to be smoother and steadier if the diameter of a divided circle of the driving gear is relatively small and decelerating transmission is performed, and the implementation is a preferred way.

In an implementation, the rack includes a base and a vertical plate; the bottom of the vertical plate is fixed to the base; the rotating shaft is rotatably mounted to the vertical plate, and the axis of the rotating shaft is oriented in a horizontal direction; the first motor is fixed to the vertical plate, and an axis of the output shaft of the first motor is oriented in the horizontal direction; both the supporting disc and the driving gear are located at one side of the vertical plate, and the first motor is located at the other side of the vertical plate; the output shaft of the first motor penetrates through the vertical plate and then is connected to the driving gear. Thus, the device as a whole is more compact and smaller in size, and the implementation is a preferred way.

In an implementation, the device further includes a shaping roller mounting plate, one end of the shaping roller mounting plate is mounted to the vertical plate in a way of being capable of moving up and down, the vertical plate includes a sliding chute for allowing the shaping roller mounting plate to move up and down therein, and the other end of the shaping roller mounting plate is provided with the shaping roller. Thus, the distance between the shaping roller and the to-be-shaped wheel hub can be adjusted by the up-and-down movement of the shaping roller mounting plate in the sliding chute, and the implementation is a preferred way.

In an implementation, the device further includes a second driving mechanism for driving the shaping roller to rotate, the second driving mechanism includes a second motor, the second motor is fixed to the shaping roller mounting plate, and an output shaft of the second motor is connected with the shaping roller. The shaping roller also rotates, so as to improve the shaping efficiency, and keep the worn of the shaping roller to be more uniformly, and the implementation is a preferred way.

In an implementation, the device further includes a third driving mechanism for driving the shaping roller mounting plate to move up and down, the third driving mechanism includes a screw nut and a screw rod, the screw nut is arranged at the end, located on the sliding chute, of the shaping roller mounting plate, the screw rod includes a force application end and a driving end, the force application end is located above the vertical plate, and the driving end penetrates into the sliding chute from the top side of the vertical plate and is screwed into the screw nut. Namely the screw rod is rotated at the force application end, the shaping roller mounting plate is capable of moving up and down relative to the vertical plate, the shaping roller is more accurate in movement position and also more convenient to move due to the characteristics of the screw rod and the screw nut, and the implementation is a preferred way.

The present disclosure is further described below in combination with the accompanying drawings and the specific embodiments. It should be understood that the specific embodiments described herein are only intended to explain the present disclosure, rather than to limit the present disclosure; in addition, the embodiments described below are only a part of embodiments of the present disclosure instead of all the embodiments, and all of the other embodiments which can be obtained by the ordinary skilled in the art according to the embodiments on the premise that no creative work is provided fall into the protection scope of the present disclosure.

The embodiment provides an automobile wheel hub shaping device, and it may be understood that the structural principle of the automobile wheel hub shaping device in the embodiment is also suitable for other automobile wheel hubs.

As shown in FIG. 1, the automobile wheel hub shaping device includes a clamping part for clamping a to-be-shaped wheel hub, a first driving mechanism for driving the clamping part to rotate, a shaping roller 31 for shaping the to-be-shaped wheel hub, and a rack; all of the clamping part, the first driving mechanism and the shaping roller 31 are mounted to the rack, the shaping roller 31 is located above the clamping part and is capable of moving relative to the clamping part; and the clamping part is equipped with a fixing part for fixing the to-be-shaped wheel hub.

It should be noted that FIG. 1 is an exploded view which is also named as an exploded schematic diagram, and therefore, a position of a part is not a position during normal operation.

In the embodiment, the clamping part includes a locating shaft 11 matched with an axle hole of the to-be-shaped wheel hub and a supporting disc 12 matched with an inner cavity of the to-be-shaped wheel hub, the locating shaft 11 and the supporting disc 12 are fixed together, and the axes of the locating shaft 11 and the supporting disc 12 are superposed; and the clamping part is capable of rotating relative to the rack by taking the axis of the supporting disc 12 as an axis.

In the embodiment, the clamping part further includes a locking ring 13 for locking the to-be-shaped wheel hub, the inner wall of the locking ring 13 is provided with internal threads, and the locating shaft 11 is provided with external threads matched with the internal threads.

In the embodiment, the clamping part further includes anti-loosening buckles 14, the anti-loosening buckles 14 include fixing inserted pins 141, and the fixing inserted pins 141 pass through the locking ring 13 from outer side of an outer circle surface of the locking ring 13 and are inserted into the locating shaft 11; and the outer circle surface of the locating shaft 11 is provided with inserted pin holes 142 matched with the fixing inserted pins 141. Thus, the phenomenon that the locking ring 13 is loosened during vibration to result in position offset of the to-be-shaped wheel hub to affect the shaping effect may be avoided. Specifically, the fixing inserted pins 141 of the anti-loosening buckles are elliptical columns, while the inserted pin holes 142 are round holes, thus, the fixing inserted pins 141 may also be matched with the inserted pin holes 142 even if position offset of the fixing inserted pins 141 and the inserted pin holes 142 exists after the locking ring 13 is screwed into the locating shaft 11. More specifically, four anti-loosening buckles are arranged and are uniformly distributed on the outer circumference of the locking ring; in addition, in order to ensure that the anti-loosening buckles may be more stably fixed to the locking ring, the locking ring is further provided with mounting guide posts 143, the anti-loosening buckles 14 are provided with guide post holes 144 matched with the mounting guide posts 143, and thus, the anti-loosening buckles 14 may be mounted more smoothly, and the anti-loosening buckles 14 may also be firmly mounted to the locking ring. The surfaces of the anti-loosening buckles 14 are further provided with handle buckles 145 by which it is convenient for mounting and dismounting the anti-loosening buckles 14.

In the embodiment, the device further includes a rotating shaft 15 capable of rotating relative to the rack, one end of the rotating shaft 15 is rotatably mounted to the rack, the other end of the rotating shaft 15 is fixed to the supporting disc 12, and an axis of the rotating shaft 15 is superposed with the axis of the supporting disc 12; and the rack includes a rotating shaft hole or a rotating support matched with the rotating shaft 15. In the embodiment, the first driving mechanism includes a first motor 21 and a driving gear 22; the first motor 21 is fixed to the rack; the driving gear 22 is connected with an output shaft of the first motor 21, and the driving gear 22 rotates under the driving of the first motor 21; and the supporting disc 12 further includes teeth engaged with teeth of the driving gear 22, the teeth of the supporting disc are arranged to the outer circle surface of one side of the supporting disc 12, and thus, the driving is more effective. In the embodiment, the diameter of a divided circle of the driving gear 22 is smaller than the diameter of the supporting disc, therefore, decelerating transmission is performed, a larger torque may be transferred to the supporting disc 12, and shaping is also made to be smoother and steadier. Specifically, the teeth on the driving gear 22 and the teeth on the supporting disc are both trapezoidal teeth, and thus, the teeth are convenient to manufacture and not easy to be worn.

In the embodiment, the rack includes a base 41 and a vertical plate 42; the bottom of the vertical plate 42 is fixed to the base 41; the rotating shaft 15 is rotatably mounted to the vertical plate 42, and the axis of the rotating shaft 15 is oriented in a horizontal direction; the first motor 21 is fixed to the vertical plate 42, and the axis of the output shaft of the first motor 21 is oriented in the horizontal direction; both the supporting disc 12 and the driving gear 22 are located at one side of the vertical plate 42, and the first motor 21 is located at the other side of the vertical plate 42; the output shaft of the first motor 21 penetrates through the vertical plate 42 and then is connected to the driving gear 22. Specifically, the output shaft of the first motor 21 is connected with the driving gear 22 by a coupling 24, namely the driving gear 22 is further provided with a gear shaft integrated with a gear.

In the embodiment, the device further includes a shaping roller mounting plate 33, one end of the shaping roller mounting plate 33 is mounted to the vertical plate 42 in a way of being capable of moving up and down, the vertical plate 42 includes a sliding chute for allowing the shaping roller mounting plate to move up and down therein, and the other end of the shaping roller mounting plate 33 is provided with the shaping roller 31. Thus, the distance between the shaping roller 31 and the to-be-shaped wheel hub can be adjusted by the up-and-down movement of the shaping roller mounting plate 33 in the sliding chute.

In the embodiment, the device further includes a second driving mechanism for driving the shaping roller 31 to rotate, the second driving mechanism includes a second motor 35, the second motor 35 is fixed to the shaping roller mounting plate 33, and an output shaft of the second motor 35 is connected with the shaping roller 31. The shaping roller also rotates, so as to improve the shaping efficiency, and keep the worn of the shaping roller 31 to be more uniformly. Specifically, the movement relationship between the shaping roller 31 and the to-be-shaped wheel hub may include three conditions: 1) the rotation directions are same, but the rotating speeds are different, thus, the shaping roller 31 and the to-be-shaped wheel hub generate relative movement by virtue of a rotating speed difference, and then, the shaping is performed; 2) the rotation directions are different, thus, the shaping roller 31 and the to-be-shaped wheel hub generate relative movement by virtue of rotating speed superposition, and then, the shaping is performed; and 3) the shaping roller is fixed, the to-be-shaped wheel hub rotates to generate relative movement, and then, shaping is performed. Deformations of the to-be-shaped wheel hub are different from each other, and therefore, different ways may be adopted according to different conditions, for example, burrs on the surface of the to-be-shaped wheel hub are directional, and it is possible that the burrs are more favorably removed if different ways are adopted according to the directions of the burrs.

Specifically, the output shaft of the second motor is connected to the shaping roller 31 by a bevel gear, thus, it can be ensured that the rotation axis of the shaping roller 31 is oriented in the horizontal direction and is parallel to the rotation axis of the automobile wheel hub. In addition, in the embodiment, the device is further provided with a shaping cover 36 capable of partially covering the shaping roller 31 so that fragments are prevented from flying out of the shaping cover 36.

In the embodiment, the device further includes a third driving mechanism for driving the shaping roller mounting plate 33 to move up and down, the third driving mechanism includes a screw nut (not shown in the figure) and a screw rod 37, the screw nut is arranged at the end, located on the sliding chute, of the shaping roller mounting plate 33, the screw rod 37 includes a force application end and a driving end, the force application end is located above the vertical plate 42, and the driving end penetrates into the sliding chute from the top side of the vertical plate 42 and is screwed into the screw nut. Namely the screw rod 37 is rotated at the force application end, the shaping roller mounting plate 33 is capable of moving up and down relative to the vertical plate 42, the up-and-down position of the screw rod 37 is fixed, and the shaping roller 31 is more accurate in movement position and also move convenient to move due to the characteristics of the screw rod and the screw nut. Specifically, a rolling bearing is mounted around the screw rod 37, a bearing hole is formed in the vertical plate 42, and thus, the screw rod 37 is capable of smoothly rotating.

In order to better understand the automobile wheel hub shaping device, a using method of the automobile wheel hub shaping device is introduced below, and the method includes the following steps:

in S501: mounting the cavity of the automobile wheel hub around the locating shaft 11 in a manner that the cavity of the automobile wheel hub faces the supporting disc 12, and axially abuts against the supporting disc 12;

in S502: screwing the locking ring 13 into the locating shaft 11, and fixing the axial position of the automobile wheel hub;

in S503: mounting the anti-loosening buckles 14 to the locking ring 13, and inserting the fixing inserted pins 141 into the inserted pin holes;

in S504: rotating the screw rod 37, and adjusting the position of the shaping roller 31 in such a way that the radial distance from the shaping roller 31 to the outer circle surface of the automobile wheel hub is a preset distance, herein the preset distance is required to be set according to the deformation degree of the automobile wheel hub, of course, the automobile wheel hub is required to be respectively shaped in several times if the automobile wheel hub is excessively deformed, and therefore, in each shaping process, the distance is inadvisably excessively short so as to avoid excessively high resistance;

in S505: starting the first motor 21, driving the automobile wheel hub to rotate, and then, driving the second motor 35 to extrude the shaping roller radially so as to shape the rotating automobile wheel hub during rotation.

Further, if it is not easy to accurately determine the distance from the shaping roller to the automobile wheel hub before shaping due to deformation on various parts of the automobile wheel hub, the following steps may be adopted:

in S601: mounting the cavity of the automobile wheel hub around the locating shaft 11 in a manner that the cavity of the automobile wheel hub faces the supporting disc 12, and axially abuts against the supporting disc 12;

in S602: screwing the locking ring 13 into the locating shaft 11, and fixing the axial position of the automobile wheel hub;

in S603: mounting the anti-loosening buckles 14 to the locking ring 13, and inserting the fixing inserted pins 141 into the inserted pin holes;

in S604: rotating the screw rod 37, and adjusting the position of the shaping roller 31 in such a way that the radial distance from the shaping roller 31 to the outer circle surface of the automobile wheel hub is maximum;

in S605: starting the first motor 21, driving the automobile wheel hub to rotate, and then, driving the second motor 35;

in S606: rotating the screw rod 37, adjusting the position of the shaping roller 31 in such a way that the shaping roller 31 approaches the automobile wheel hub gradually, and stops the adjustment after the shaping roller 31 comes into contact with the automobile wheel hub, so as to extrude the shaping roller 31 radially to shape the rotating automobile wheel hub during rotation; after shaping is completed, adjusting the position of the shaping roller 31 again, and carrying out shaping again until the shaping of all the deformed parts is completed.

The above mentioned is only a preferred embodiment of the present disclosure instead of limiting the protection scope of the present disclosure, and any modification, equivalent substitution, improvement and the like made within the spirit and principle of the present disclosure should fall into the protection scope of the present disclosure.

The invention claimed is:

1. An automobile wheel hub shaping device, the automobile wheel hub shaping device comprising a clamping part configured to clamp a wheel hub to be shaped, a first driving mechanism for driving the clamping part to rotate, a shaping roller for shaping the wheel hub to be shaped, and a rack comprising a vertical plate; all of the clamping part, the first driving mechanism and the shaping roller being mounted to the rack, the shaping roller being located above the clamping part, and the shaping roller being configured to move relative to the clamping part;

wherein the automobile wheel hub shaping device further comprises a rotating shaft configured to rotate relative to the rack, the rotating shaft has a first end and a second end, the first end has a first diameter that is less than a second diameter of the second end, the first end of the rotating shaft is rotatably mounted to the rack, and the second end of the rotating shaft is fixed to a supporting disc of the clamping part;

wherein the automobile wheel hub shaping device further comprises a shaping roller mounting plate, a first end of the shaping roller mounting plate is mounted to the vertical plate in a way that enables the shaping roller mounting plate to move up and down, the vertical plate comprises a sliding chute for allowing the shaping roller mounting plate to move up and down therein, and a second end of the shaping roller mounting plate is provided with the shaping roller; and wherein the automobile wheel hub shaping device further comprises a third driving mechanism for driving the shaping roller mounting plate to move up and down, the third driving mechanism comprising a screw rod, the screw rod comprising a force application end and a driving end, the force application end being located above the vertical plate, and the driving end penetrating into the sliding chute from a top side of the vertical plate.

2. The automobile wheel hub shaping device of claim 1, wherein the clamping part comprises a locating shaft configured to match with an axle hole of the wheel hub to be shaped and the supporting disc configured to match with an inner cavity of the wheel hub to be shaped, the locating shaft and the supporting disc are fixed together, and axes of the locating shaft and the supporting disc are superposed; and the clamping part is configured to rotate about the axis of the supporting disc.

3. The automobile wheel hub shaping device of claim 2, wherein the clamping part further comprises a locking ring for locking the wheel hub to be shaped, an inner wall of the locking ring is provided with internal threads, and the locating shaft is provided with external threads matched with the internal threads.

4. The automobile wheel hub shaping device of claim 3, wherein the clamping part further comprises anti-loosening buckles, the anti-loosening buckles comprise fixing inserted pins, and the fixing inserted pins pass through the locking ring from an outer side of an outer circle surface of the locking ring and are inserted into the locating shaft; and an outer circle surface of the locating shaft is provided with inserted pin holes matched with the fixing inserted pins.

5. The automobile wheel hub shaping device of claim 4, wherein an axis of the rotating shaft is superposed with the axis of the supporting disc; and the rack comprises a rotating shaft hole matched with the rotating shaft.

6. The automobile wheel hub shaping device of claim 5, wherein the first driving mechanism comprises a first motor and a driving gear; the first motor is fixed to the rack; the driving gear is connected with an output shaft of the first motor, and the driving gear rotates under a driving of the first motor; and the supporting disc further comprises teeth engaged with teeth of the driving gear, and the teeth of the supporting disc are arranged on an outer circle surface of one side of the supporting disc.

7. The automobile wheel hub shaping device of claim 6, wherein the rack further comprises a base; a bottom of the vertical plate is fixed to the base; the rotating shaft is rotatably mounted to the vertical plate, and the axis of the rotating shaft is oriented in a horizontal direction; the first motor is fixed to the vertical plate, and an axis of the output shaft of the first motor is oriented in the horizontal direction; both the supporting disc and the driving gear are located at one side of the vertical plate, and the first motor is located at a second side of the vertical plate; the output shaft of the first motor penetrates through the vertical plate and then is connected to the driving gear.

8. The automobile wheel hub shaping device of claim 1, further comprising a second driving mechanism for driving the shaping roller to rotate, the second driving mechanism comprising a second motor, the second motor being fixed to the shaping roller mounting plate, and an output shaft of the second motor being connected with the shaping roller.

\* \* \* \* \*